(12) United States Patent
Tippmann et al.

(10) Patent No.: US 11,073,322 B2
(45) Date of Patent: Jul. 27, 2021

(54) MODULAR HEAT TRANSFER SYSTEM

(71) Applicant: Tippmann Companies LLC, Fort Wayne, IN (US)

(72) Inventors: Daniel J. Tippmann, Fort Wayne, IN (US); Robert T. Tippmann, III, Fort Wayne, IN (US)

(73) Assignee: TIPPMANN ENGINEERING, LLC, Fort Wayne, IN (US)

( * ) Notice: Subject to any disclaimer, the term of this patent is extended or adjusted under 35 U.S.C. 154(b) by 224 days.

(21) Appl. No.: 15/974,601

(22) Filed: May 8, 2018

(65) Prior Publication Data

US 2018/0320949 A1 Nov. 8, 2018

Related U.S. Application Data

(60) Provisional application No. 62/502,923, filed on May 8, 2017.

(51) Int. Cl.
| | |
|---|---|
| *F25D 13/04* | (2006.01) |
| *F25D 17/00* | (2006.01) |
| *F25D 17/06* | (2006.01) |
| *B65G 1/14* | (2006.01) |
| *F25D 31/00* | (2006.01) |
| *F25D 13/00* | (2006.01) |
| *B65G 1/02* | (2006.01) |

(52) U.S. Cl.
CPC .............. *F25D 13/04* (2013.01); *B65G 1/14* (2013.01); *F25D 13/00* (2013.01); *F25D 17/005* (2013.01); *F25D 17/06* (2013.01); *F25D 31/00* (2013.01); *B65G 1/02* (2013.01); *B65G 2201/0202* (2013.01); *F25D 2317/0664* (2013.01)

(58) Field of Classification Search
CPC ........ F25D 13/04; F25D 13/00; F25D 17/005; F25D 17/06; F25D 31/00; B65G 1/14; B65G 1/02; B65G 2201/0202
USPC ......................................................... 454/174
See application file for complete search history.

(56) References Cited

U.S. PATENT DOCUMENTS

| | | | | |
|---|---|---|---|---|
| 4,063,432 | A * | 12/1977 | Chaussy | ................... A23L 3/36 62/419 |
| 6,579,053 | B1 * | 6/2003 | Grams | ..................... B25J 15/10 198/348 |
| 8,783,047 | B2 | 7/2014 | Tippmann | |
| 8,919,142 | B2 | 12/2014 | Tippmann | |
| 9,297,570 | B2 | 3/2016 | Tippmann | |
| 9,618,256 | B2 | 4/2017 | Tippmann | |
| 9,915,463 | B2 | 3/2018 | Tippmann | |

(Continued)

*Primary Examiner* — Kenneth J Hansen
*Assistant Examiner* — Dana K Tighe
(74) *Attorney, Agent, or Firm* — Faegre Drinker Biddle & Reath LLP

(57) ABSTRACT

A modular air handler is adapted for installation in a racking assembly behind palletized product. The air handler operates to move air through the adjacent layers of palletized product upon placement of the palletized product in the adjacent space. The air handler can be deactivated in order to prevent unnecessary air flow when no palletized product is present in the adjacent space. A number of the modular air handlers may be provided for a racking assembly, such that individual pallet bays may be activated or deactivated as palletized product is deposited or withdrawn from the various pallet bays of the rack.

20 Claims, 14 Drawing Sheets

(56) References Cited

U.S. PATENT DOCUMENTS

2008/0232942 A1* 9/2008 Ellingson ............... B66F 9/127
  414/347
2017/0086485 A1  3/2017 Tippmann

* cited by examiner

FIG_6

MODULAR HEAT TRANSFER SYSTEM

CROSS REFERENCE TO RELATED APPLICATION

This application claims the benefit under Title 35, U.S.C. § 119(e) of U.S. Provisional Patent Application Ser. No. 62/502,923, entitled MODULAR QUICKFREEZE SYSTEM and filed on May 8, 2017, the entire disclosure of which is hereby expressly incorporated by reference herein.

BACKGROUND

Technical Field

The present disclosure relates to palletized product warehousing and treatment. More particularly, the present disclosure relates to spacing, stacking and heat transfer structures used in a warehouse that is capable of altering and/or holding steady the temperature of a quantity of palletized product.

Description of the Related Art

Freezer warehouses are known in which large pallets of items including meats, fruit, vegetables, prepared foods, and the like are frozen in blast rooms of a warehouse and then are moved to a storage part of the warehouse to be maintained at a frozen temperature until their removal.

U.S. Pat. No. 8,783,047 entitled "Rack-Aisle Freezing System for Palletized Product", filed on Sep. 8, 2010, the entire disclosure of which is hereby explicitly incorporated by reference herein, relates to an improved system for freezing food products. Shown in FIG. 1 is a large warehouse 2 that can be used to freeze and maintain perishable foods or like products. Large pallets of items, including meats, fruits, vegetables, prepared foods, and the like, are sent to warehouse 2 to be frozen employing a system whereby the palletized foods are frozen on storage racks.

FIG. 2 shows a top view of the interior of warehouse 2, in which rows of palletized product are shown such that pallet assemblies 52 abut chamber 6. As shown in FIG. 3, rows of racking 14 (see also FIG. 8) are positioned between aisles 10 and chambers 6. Each chamber 6 is enclosed by a pair of end walls 15 and top panel 17. Spacers 20 (FIGS. 5-7) separate respective rows of cases 22 to create a palletized product stack in the form of pallet assembly 52 which can be disposed and sealed against the exterior of racking 14 (FIG. 3) via forklifts 18 (see, e.g., FIGS. 3 and 4).

Air handlers 8, e.g., chillers or heaters (FIG. 2) provided in the interior of warehouse 2 produce conditioned, e.g., cold or warmed air and maintain the temperature of ambient air within the warehouse space at a desired temperature, e.g., +55° F. to −30° F. Thus, for purposes of the present disclosure, "air conditioner" refers to an air handler which can produce air conditioned to a desired state, e.g., heated or cooled. While warehouse 2 could be utilized to either freeze, cool or thaw a quantity of product housed in cases contained on pallet assemblies 52, the remaining description will use the example of a warehouse freezer, it being understood that similar arrangements and principles will be applied to a warehouse utilized to thaw product, with the air handler comprising a heater as opposed to a chiller.

Adjacent pairs of racking structures 14 (FIGS. 2-4) define a plurality of adjacent airflow chambers 6 (FIGS. 2 and 4) having air intake openings on opposite sides thereof and a plurality of air outlets having air moving devices, such as exhaust fans 12, on top panels 17, which cause conditioning air to be drawn into chambers 6 through the air intake openings in racking 14 and to then exhaust into the warehouse space. The plurality of airflow chambers 6 are each defined by a pair of end walls 15 and top wall 17 having one or more air outlets and exhaust fans 12 associated therewith (FIG. 3). Pallet assemblies 52 (FIG. 5) are pressed against the intake openings in racking 14 such that a seal is formed between the pallets and the intake openings via side periphery seals, a bottom periphery seal, and a top periphery seal. The seals together define each respective intake opening. Freezing air is drawn through air pathways 16 (FIGS. 2, 4, and 5) within the palletized product in a direction towards chamber 6 to thereby quickly freeze the product. As shown in FIG. 5, spacers 20 may be placed between rows of cases 22 of product in an attempt to provide air pathways 24 through which airflow can enter chamber 6.

U.S. Pat. No. 8,919,142 entitled "Swing Seal for a Rack-Aisle Freezing and Chilling System", filed on Mar. 29, 2011, the entire disclosure of which is hereby explicitly incorporated by reference herein, discloses a top periphery seal 40 (which may be referred to herein as a "swing seal") useable to seal an intake opening as described above and which automatically adjusts to the height of pallet assembly 52 as illustrated in FIG. 6. As illustrated in FIG. 6, pallet assembly 52 (comprised of a plurality of cases 22 stacked on spacers 20 and pallet 4) can be positioned along pallet guide 56 and pressed against airflow opening 54 such that a seal is formed between pallet assembly 52 and airflow opening 54 via side periphery seals, a bottom periphery seal and an automatically adjustable top periphery seal surrounding airflow opening 54. With such a construction, chilling or freezing air is drawn through air pathways 16 formed through pallet assembly 52, as illustrated in FIGS. 2, 4 and 5.

FIG. 5 illustrates predicate spacer 20 which is formed in an undulating "egg carton" configuration. As illustrated in FIG. 7, individual cases 22 can crush under the weight of the product contained therein and the product contained in cases stacked directly above to cause overlap of cases 22 with a spacer 20 and prohibit airflow between product cases 22 positioned on opposite sides of the obstructed spacer 20. Undulating spacers 20 are particularly susceptible to obstruction due to drooping or sagging cases 22 due to the inconsistent support structure caused by the "hill and valley" configuration of such spacers. FIG. 7 illustrates case crushing and drooping at various sides and levels of pallet assembly 52; however, this phenomenon is, in practice, more prevalently seen with respect to the spacers 20 separating lower rows of cases 22, as the bottom of pallet assembly 52 contains the heaviest cumulative load of cases 22 stacked thereon.

In the above described installation, utilizing "egg carton" spacers 20, heat transfer from chilled ambient air in warehouse 2 to the products contained in cases 22 is effected through forced convection which is facilitated by the irregular shape of egg carton spacers 20 to allow airflow in all directions through pallet assembly 52. Alternative spacers such as wood slat spacers may also be utilized to separate cases 22 on pallet 4.

For maximum effectiveness of thermal transfer between the conditioned air in warehouse 2 and the product contained in product cases 22, it is desirable to have air within the spacers continuously refreshed and replaced with conditioned air from warehouse 2. One way to achieve this air movement is to use fans 12 (FIGS. 3 and 4) to drive airflow through and around pallet assemblies 52.

SUMMARY

The present disclosure provides a modular air handler adapted for installation in a racking assembly behind palletized product. The air handler operates to move air through the adjacent layers of palletized product upon placement of the palletized product in the adjacent space. The air handler can be deactivated in order to prevent unnecessary air flow when no palletized product is present in the adjacent space. A number of the modular air handlers may be provided for a racking assembly, such that individual pallet bays may be activated or deactivated as palletized product is deposited or withdrawn from the various pallet bays of the rack.

In one form thereof, the present disclosure provides a pallet rack assembly including a pallet rack having a plurality of bays, and a modular air handler assembly received in at least one of the plurality of bays. Each bay has a bay width sized to receive a palletized product assembly including a pallet with a plurality of stacked cases received thereon, a bay height sized to receive the palletized product assembly, and a bay depth sized to receive at least two of the palletized product assembly, such that each bay defines a rearward bay and a forward bay sized to receive the palletized product assembly. The air handler assembly includes: an enclosure having a first airflow aperture facing toward the forward bay and a second airflow aperture facing away from the forward bay, the first airflow aperture of the enclosure sized to be substantially or completely blocked by the palletized product assembly when the palletized product assembly is positioned in the forward bay; and an air handler in fluid communication with the second airflow aperture of the enclosure, such that the air handler is operable to drive air through the palletized product assembly via the first airflow aperture when the air handler is activated.

In another form thereof, the present disclosure provides an air handler assembly, including an enclosure comprising a plurality of panels defining an airflow pathway between a first airflow aperture and a second airflow aperture, the plurality of panels configured to admit an airflow at one of the first and second airflow apertures and expel the airflow at the other of the first and second airflow apertures, one of the first and second airflow apertures formed on a substantially upright surface of the enclosure, and the other of the first and second airflow apertures formed on an angled surface of the enclosure, the angled surface having an angled orientation relative to the horizontal and upright directions. The assembly further includes an air handler in fluid communication with the angled airflow aperture and operable to drive the airflow along the airflow pathway when the air handler is activated.

In yet another form thereof, the present disclosure provides a method of effecting forced-air transfer through palletized product, the method including: loading an air handler assembly into a rearward pallet bay of a rack assembly, such that a first airflow aperture of the air handler assembly faces a forward pallet bay and a second airflow aperture faces rearward of the rack assembly, with an airflow pathway formed between the first and second airflow apertures; loading a palletized product assembly into the forward pallet bay such that the first airflow aperture is substantially or completely blocked by the palletized product assembly; and activating an air handler of the air handler assembly, the air handler in fluid communication with the second airflow aperture such that the step of activating drives an airflow through the palletized product assembly and along the airflow pathway.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, where.

Figure 1:
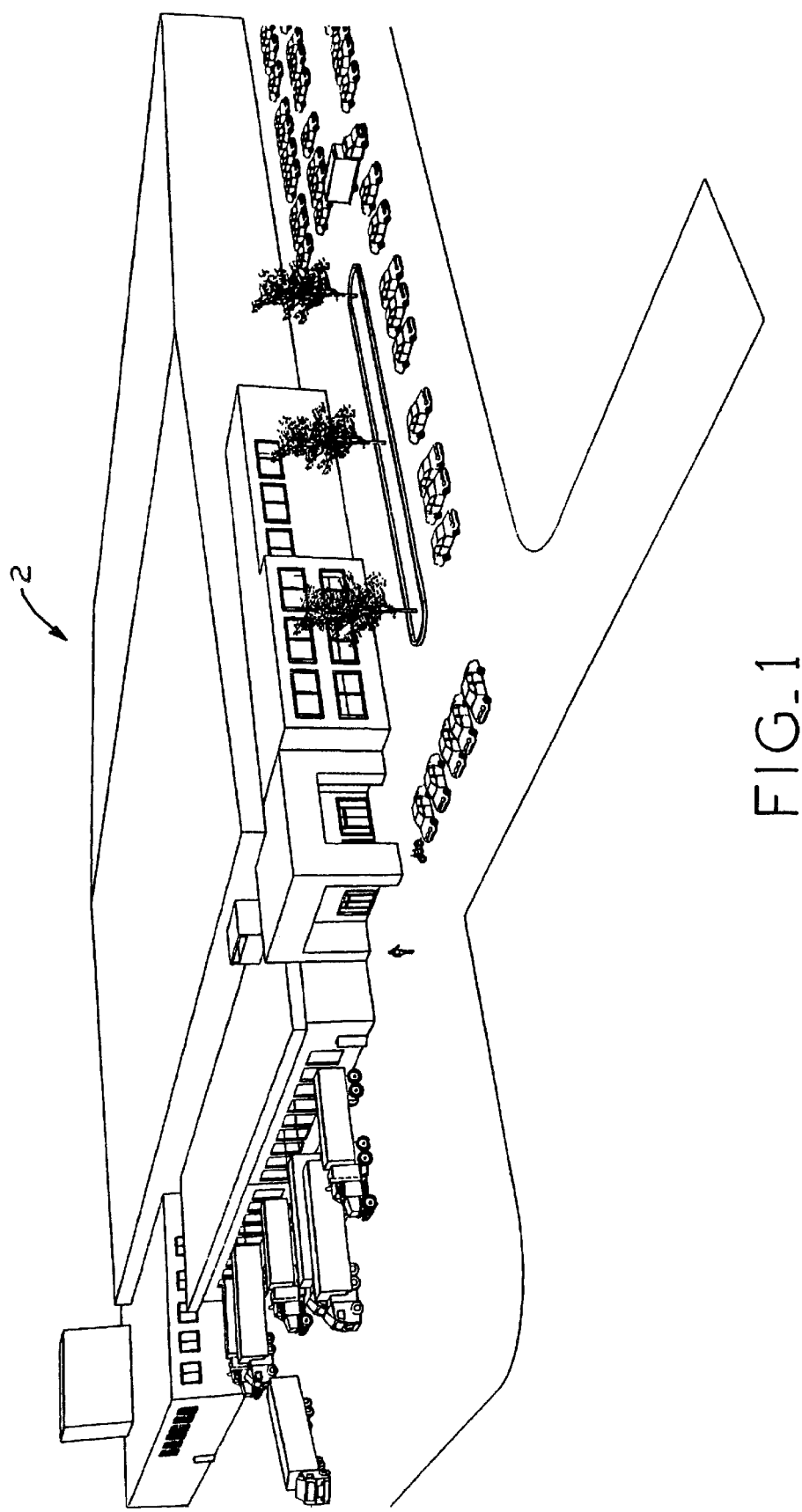
FIG. 1 is a perspective view of a warehouse incorporating a heat transfer system in accordance with the present disclosure.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION

The present disclosure provides air handler assemblies 102, shown in FIGS. 10 through 14, which can be modularly installed and activated within a rearward bay of a "2-deep" rack assembly 100 in order to induce a flow of air through a pallet assembly 52 located in the adjacent forward bay of the rack assembly 100. As described in detail below, individual air handler assemblies 102 may be activated when a palletized product assembly 52 is placed in the adjacent forward bay, and deactivated when the palletized product assembly 52 is absent from the adjacent forward bay. In this way, air handler assemblies 102 may be used to efficiently and effectively induce a heat transferring airflow through and among cases 22 of palletized product contained on assemblies 52, while avoiding any unnecessary airflow through empty pallet bays.

1. Palletized Product Environment, Assembly and Arrangement

Figure 2:
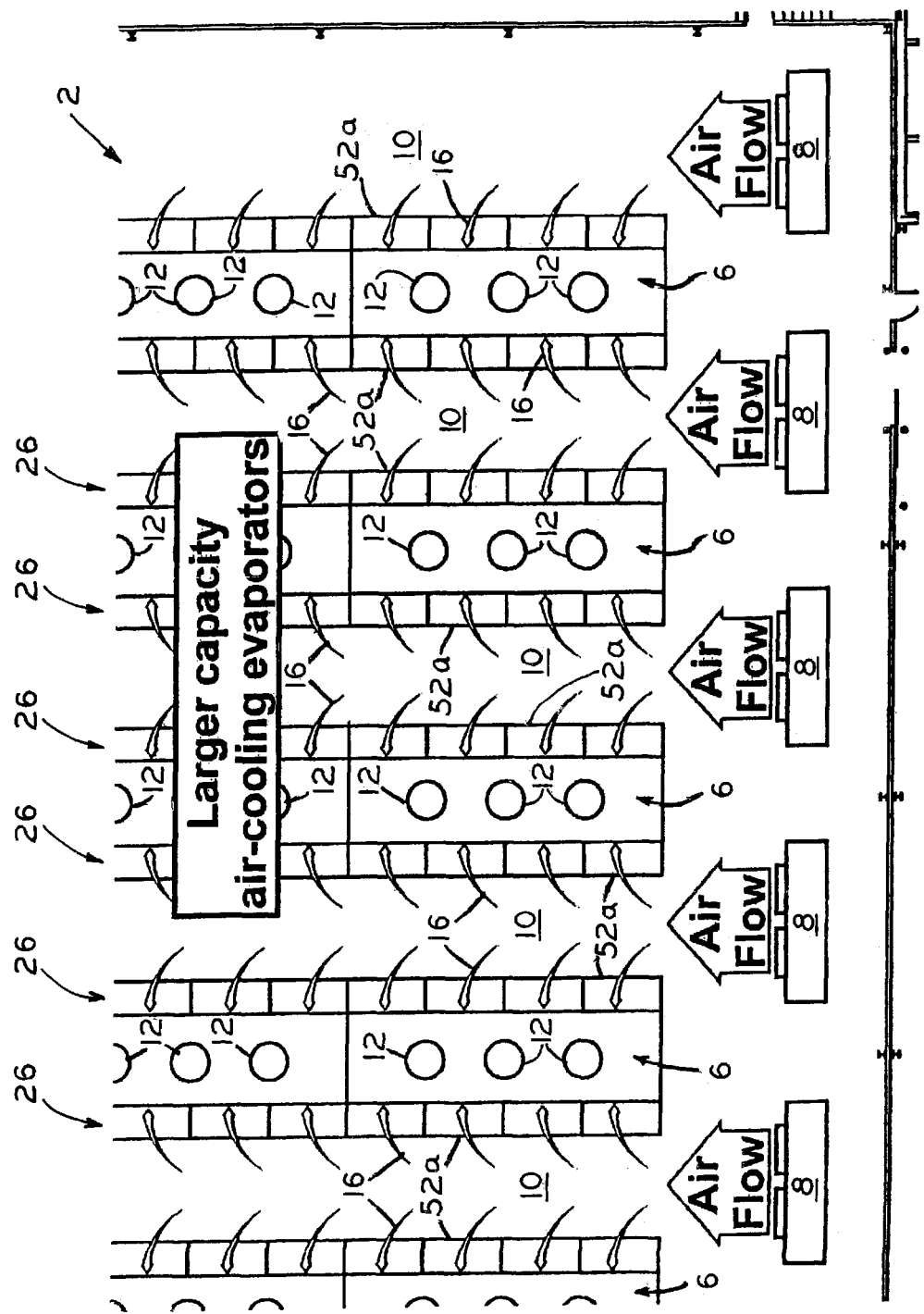
FIG. 2 is a diagrammatic top view of a heat transfer warehouse incorporating the system of the present disclosure.
Figure 3:
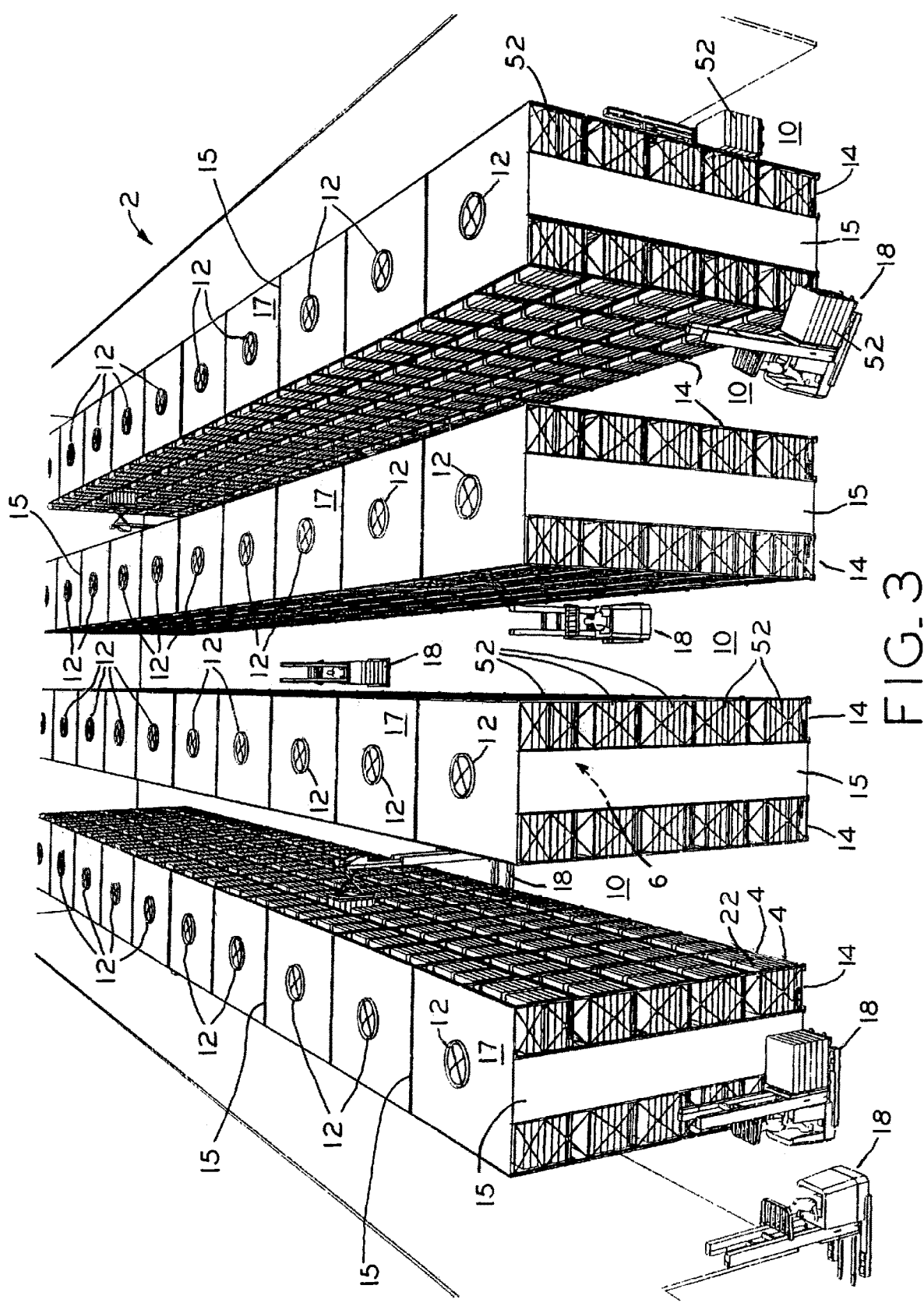
FIG. 3 is a perspective view of the interior of the warehouse illustrated in FIG. 1.
Figure 4:
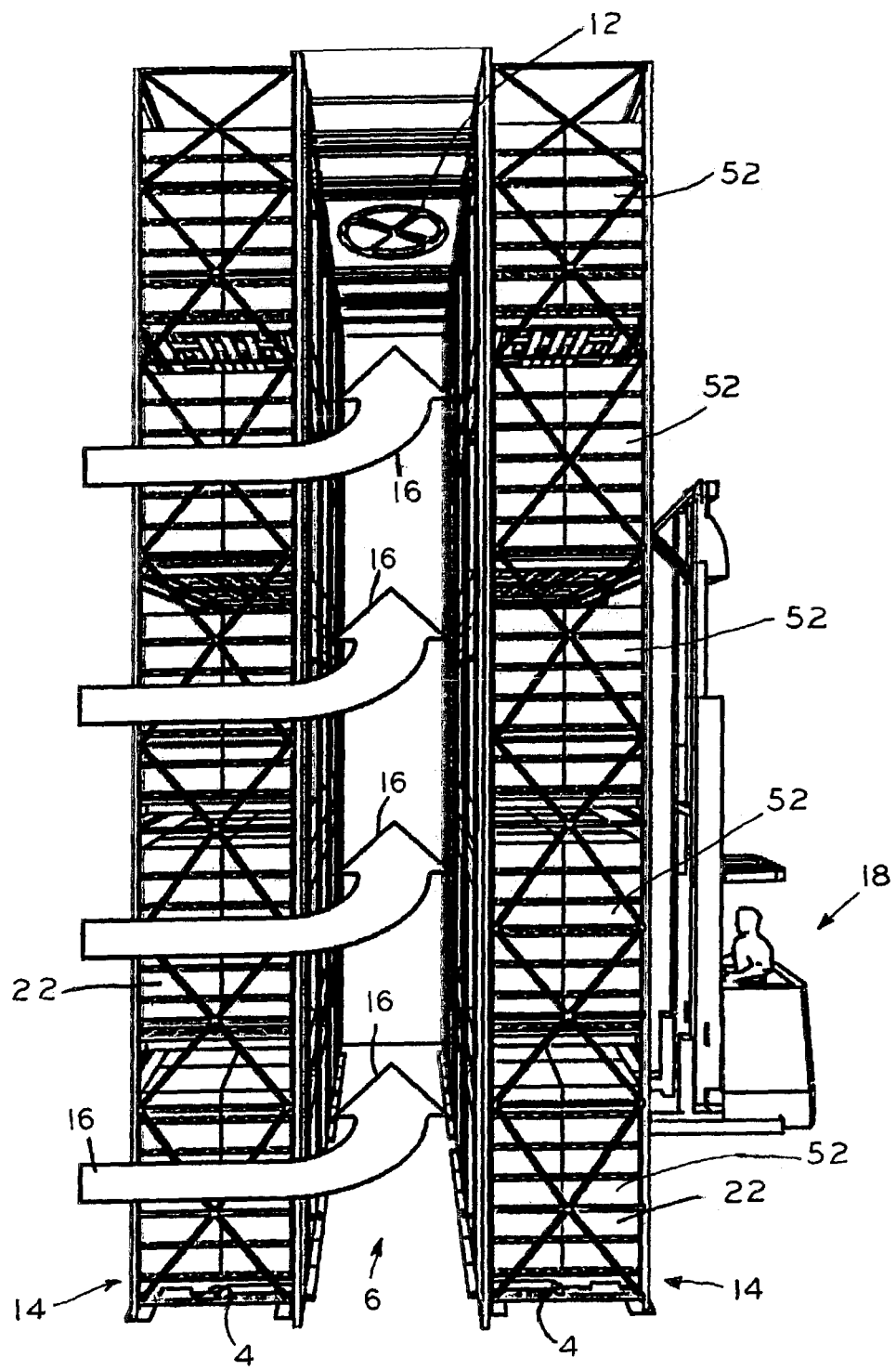
FIG. 4 is a perspective, end view of two rows of racking separated by an airflow chamber.

Pallet assemblies 52 form a part of warehouse installation 2 depicted, e.g., in FIG. 2. The general structure and components of warehouse 2 are described above in the background section of this document. A portion of this description will be repeated here to facilitate an understanding of the present invention. As illustrated in FIG. 2, warehouse 2 includes rack rows 26 separated by chambers 6 and aisles 10. As illustrated in FIGS. 3 and 4, racks 14 are sized for receiving a plurality of pallet assemblies 52. Racking 14 can be sized to receive a different number of pallet assemblies, as necessary. Different assemblies of racking 14 are illustrated, e.g., in FIGS. 3, 4, 8 and 10. As described in further detail below, "2-deep" racking 100 (shown in FIGS. 10 and 11) may be used interchangeably with racking 14 to facilitate the deployment of modular air handler assemblies 102 (best shown in FIG. 11).

Figure 9:
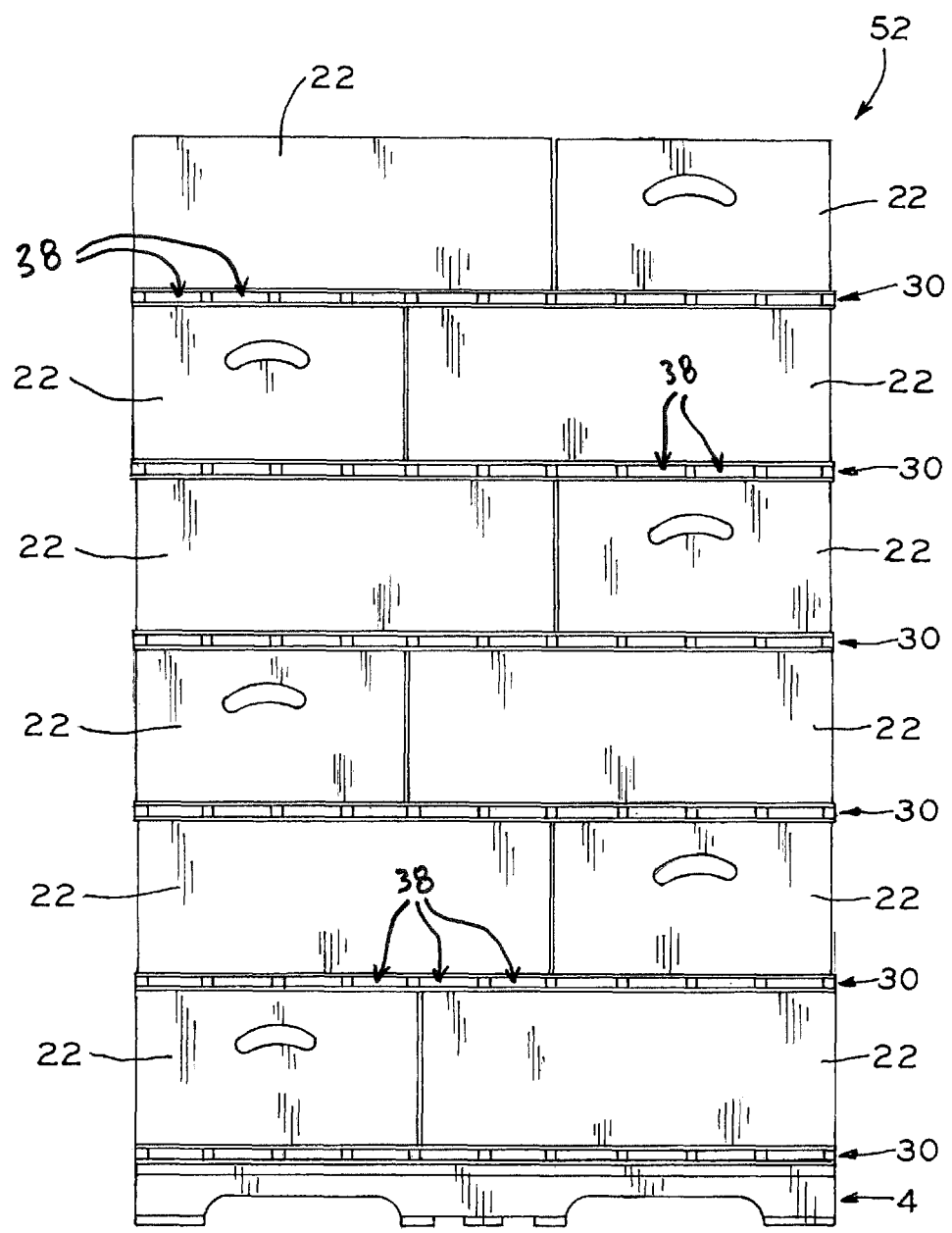
FIG. 9 is an side elevation view of a pallet assembly in accordance with the present disclosure.

As depicted, e.g., in FIG. 9, pallet assemblies 52 include pallet 4, on which a plurality of cases 22 are stacked, with spacers 30 interposed between layers of cases 22. Spacers 30 are provided to facilitate airflow across the entire downstream extent of pallet assemblies 52, thereby ensuring heat transferring airflows to all of cases 22 among the various layers stacked upon pallets 4. Exemplary spacers and other racking systems and structures which may be used in conjunction with the present disclosure are described in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference.

With pallet assemblies 52 arranged in rows and columns on racks 14 or racks 100, warehouse installation 2 can be utilized to raise, lower and/or maintain the temperature of a quantity of product contained in cases 22 to a desired set point. As illustrated in FIGS. 3 and 4, aisles 10 are sufficiently wide to allow forklifts 18 to access pallet assemblies 52. Typical aisle width is between 5 feet to 14 feet depending on the type of lift equipment. Pallet assemblies 52 each include a pallet 4 at the bottom thereof. As used in this document, "pallet" is used to denote a standard warehouse pallet of box section open at least two ends (some pallets are called 4-way pallets due to fork openings on all 4-sides) to allow the entry of the forks of a forklift so that a palletized load, i.e., pallet assembly 52, can be raised, moved about and set down easily.

Racks 14 define airflow openings 54 fluidly connected to a chamber 6, which, in the exemplary embodiment illustrated, is enclosed by a pair of end walls 15 and top panel 17. Pallet assemblies 52 are disposed and sealed against the air intake openings formed in racks 14, as described in detail below. Referring to FIG. 2, air handlers 8 are operably connected to (e.g., disposed within) warehouse space 2 so that air handlers 8 can condition (e.g., heat or cool) the ambient air in warehouse space to a desired temperature. In the event that warehouse space 2 is utilized to freeze product contained in cases 22, air handlers 8 may be chillers which produce air on the order of −5° F. to −30° F. In the event that warehouse space 2 is utilized to thaw product contained in cases 22, air handlers 8 may be heaters which produce air on the order of 30° F. to 60° F. Additional air handlers, illustratively fans 12, circulate ambient air conditioned by air handlers 8 such that air conditioned by air handlers 8 flows through pallet assemblies 52 and through airflow openings 54 formed in racks 14. Moreover, rack assembly 100 may be used for various heat transfer operations including freezing, thawing, chilling, heating or tempering of product contained within cases 22. Air handlers 8 may be provided in any configuration consistent with any of these operations, and may be operable to condition the air within warehouse space 2 in any desired manner as required or desired for a particular application, including conditioning for a particular temperature and/or humidity.

In one exemplary embodiment, pallet 4 defines a standard 40 inch by 48 inch rectangular outer perimeter. With such a pallet, the upper and lower surfaces of spacer 30 illustrated in FIG. 9 will both be substantially rectangular in shape and about 40 inches by about 48 inches. Stated another way, the upper and lower surfaces are both nominally rectangular and nominally measure about 40 inches by 48 inches. In certain alternative embodiments, spacers 30 will be slightly oversized with respect to pallet 4, e.g., by having an overhang of up to an inch relative to the perimeter of pallet 4. These embodiments are also considered to be sized and shaped "about congruent" to the outer perimeter of pallet 4. Alternative pallet sizes, such as a standard European pallet may be utilized. Spacers 30 may be about congruent with the pallet and cases with which the spacers 30 are paired.

Figure 5:
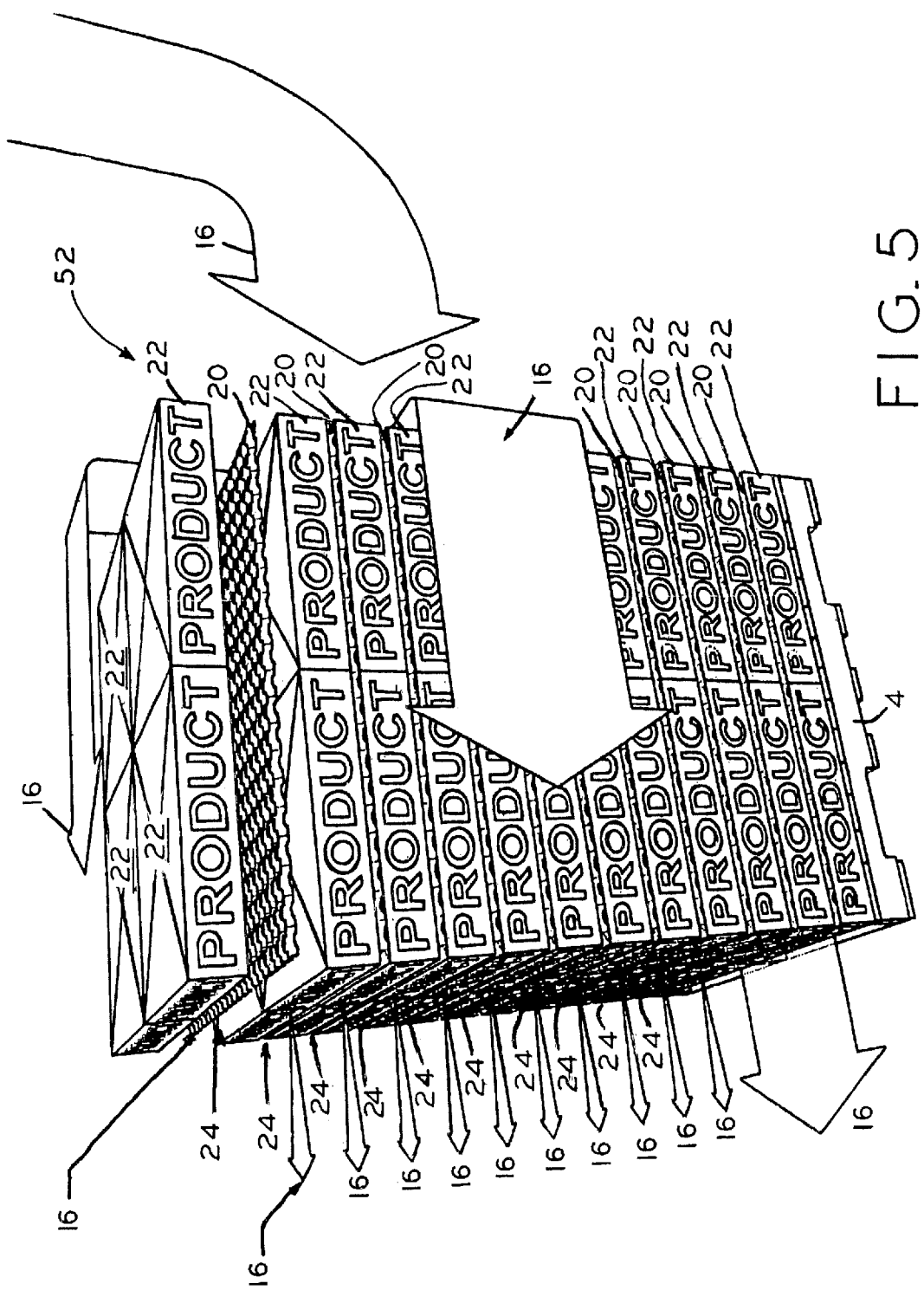
FIG. 5 is a perspective view showing a desired airflow through a pallet assembly.
Figure 6:
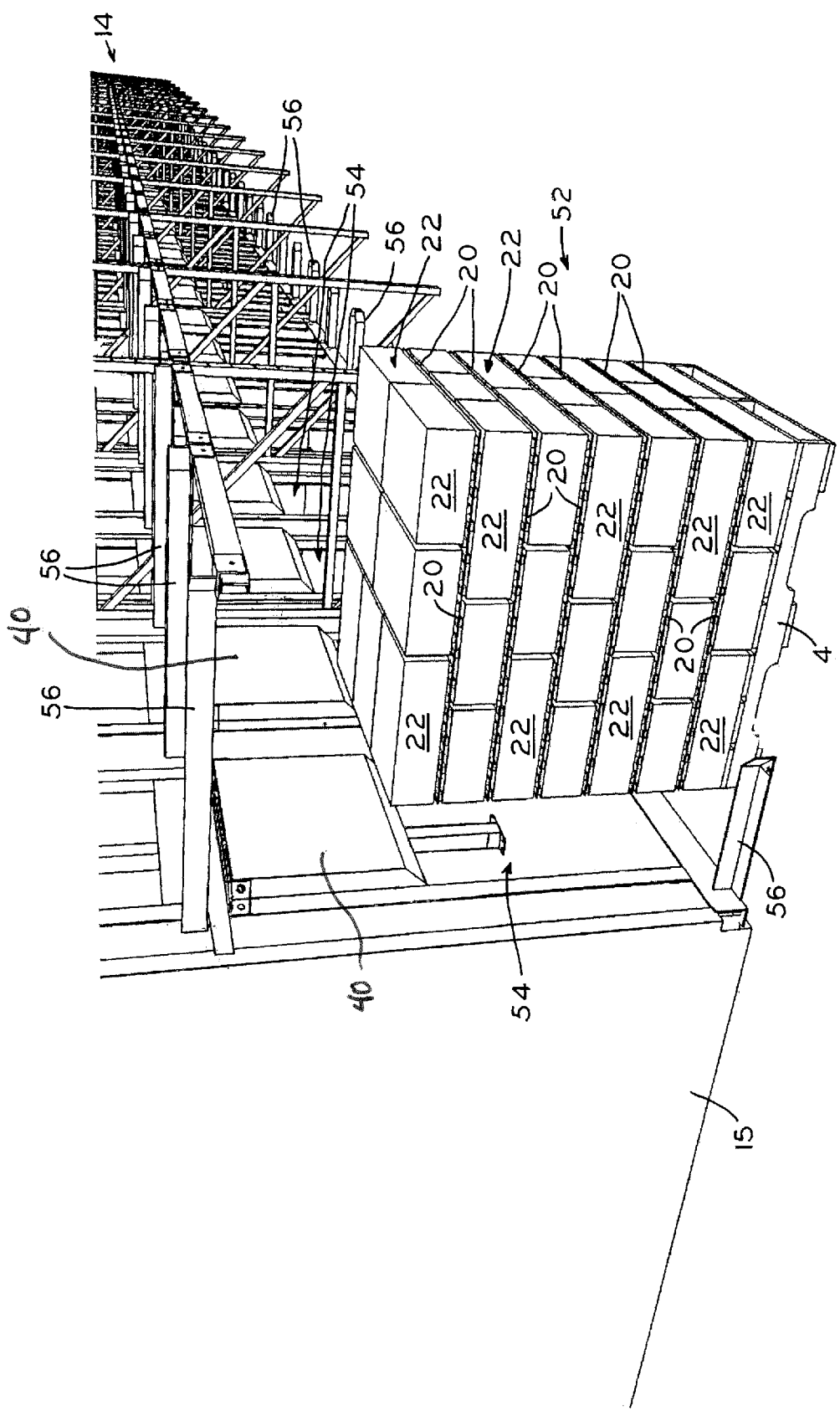
FIG. 6 is a perspective view illustrating loading of pallet assemblies into the racking illustrated, e.g., in FIGS. 3 and 4.
Figure 7:
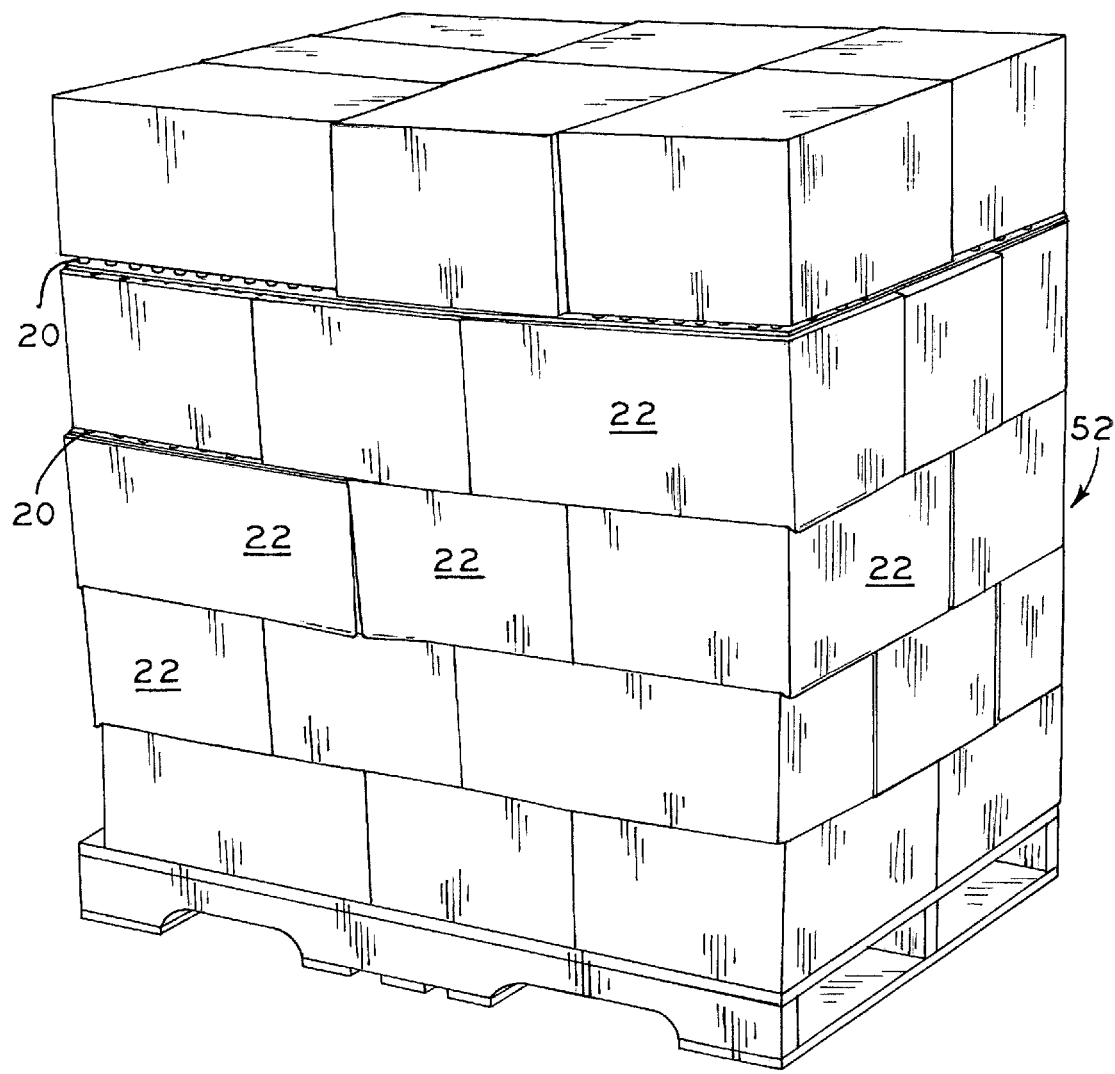
FIG. 7 is a perspective view of a pallet assembly incorporating a predicate spacer.
Figure 8:
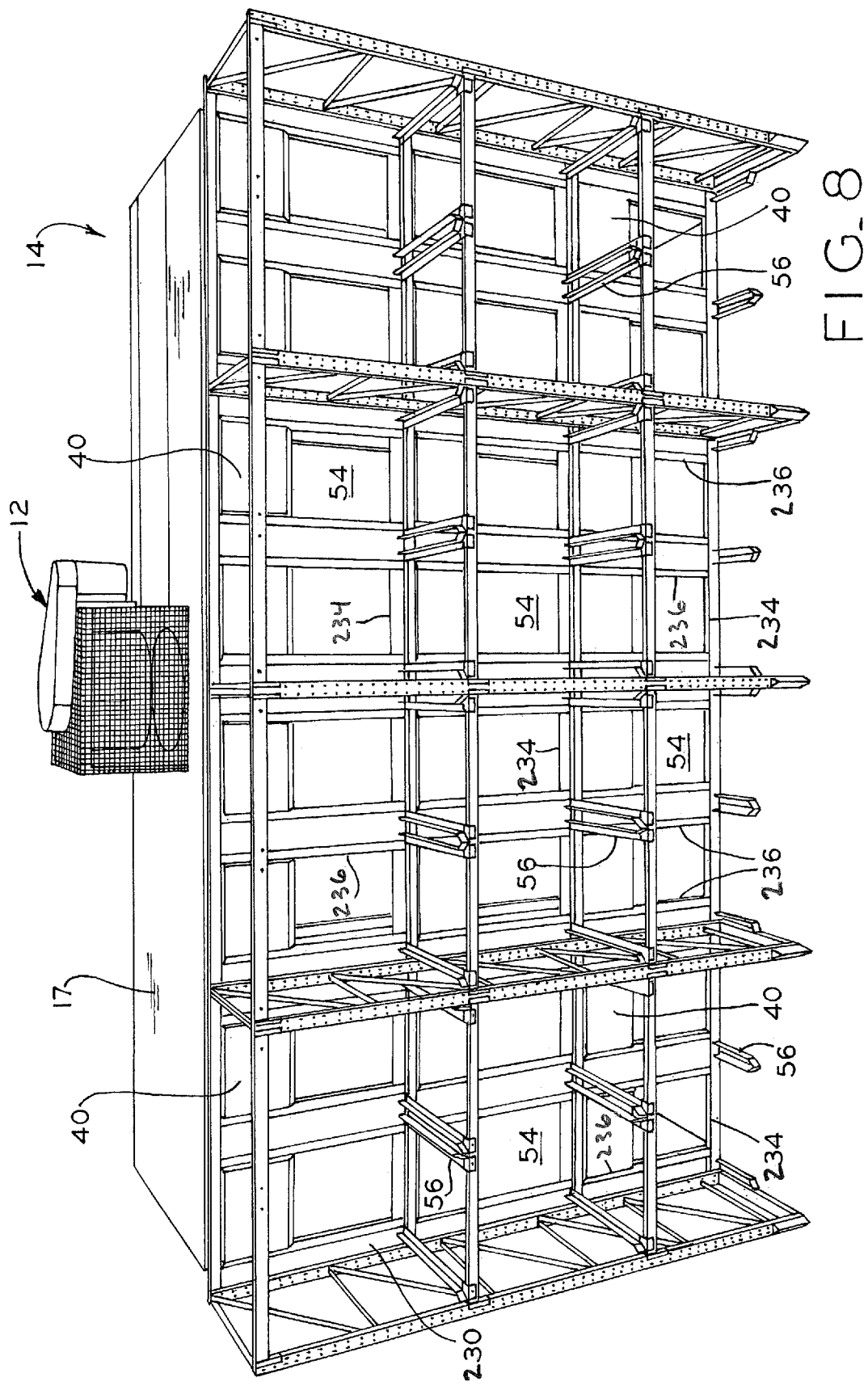
FIG. 8 is a perspective view of a portion of a racking structure accommodating 24 pallet assembly receiving spaces on each side thereof.

As illustrated in, e.g., FIG. 9, spacers 30 may have longitudinal airflow channels 38 formed therethrough. Airflow channels 38 facilitate a generally longitudinal, directional flow of air through the spacer from an input at one side of the palletized product assembly 52 to an output at an opposite side. Further discussion of exemplary longitudinal channels and spacer arrangements can be found in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference. Although spacers 30 provide enhanced airflow and heat transfer performance characteristics as compared to predicate spacers 20 (FIGS. 5-7) and are used in an exemplary embodiment of pallet assembly 52, it is contemplated that predicate spacers 20 may also be used in pallet assembly 52, as required or desired for a particular application.

2. Individualized Air Handlers for Designated Pallet Bays

Figure 10:
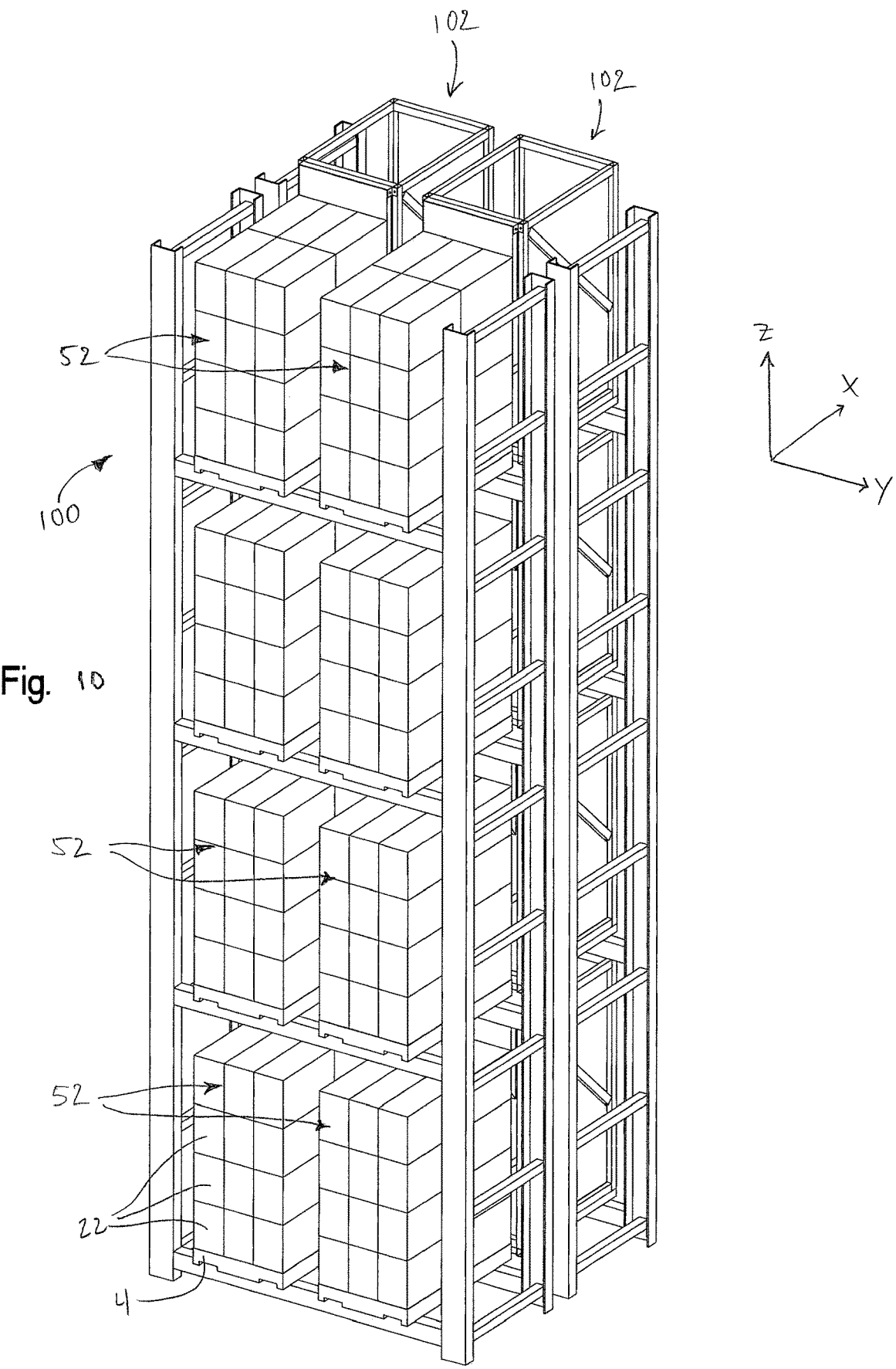
FIG. 10 is a perspective view of a rack assembly in accordance with the present disclosure, in which air handler assemblies are positioned in rearward bays and palletized product assemblies are positioned in adjacent forward bays.
Figure 11:
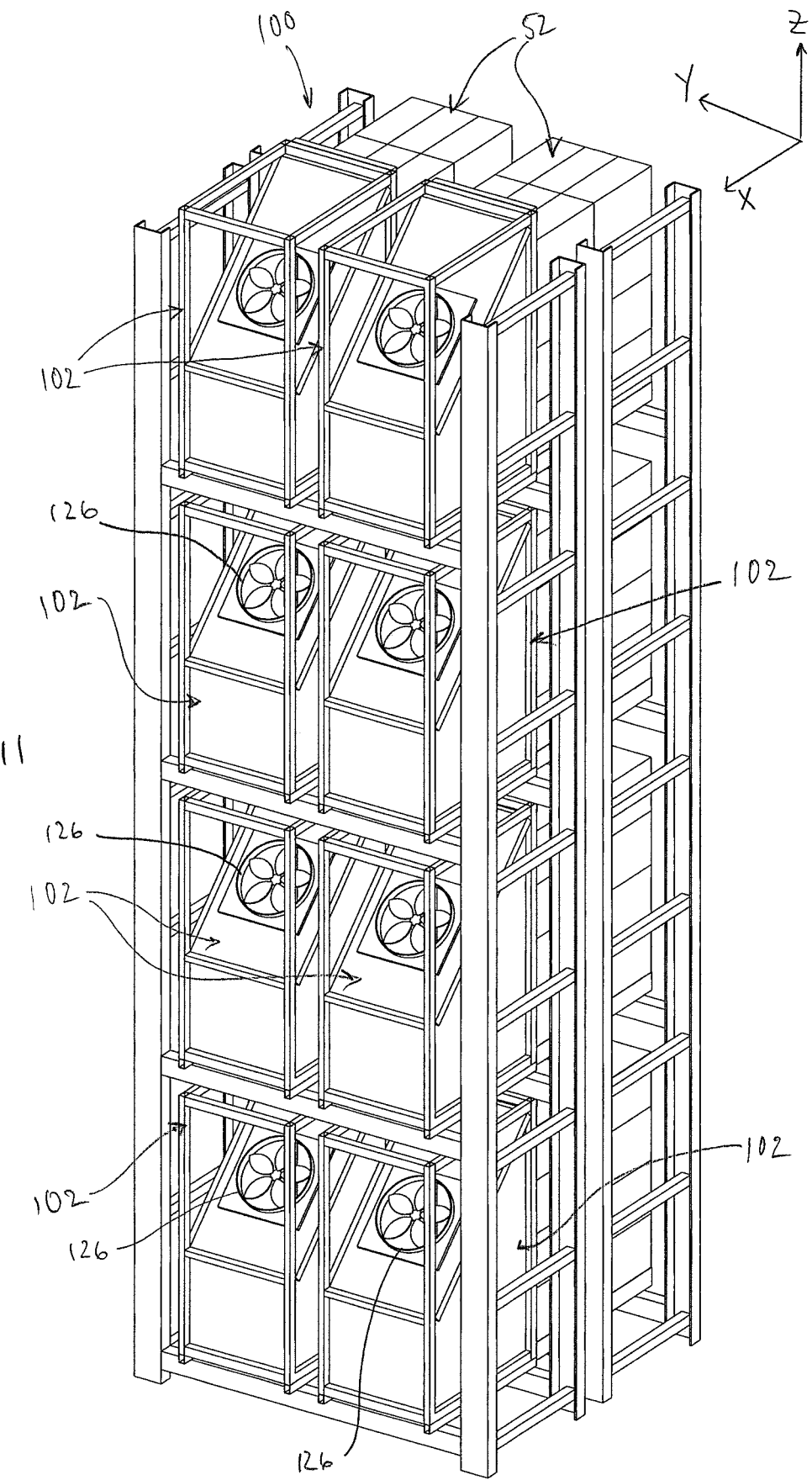
FIG. 11 is another perspective view of the rack assembly shown in FIG. 10, illustrating the air handler assemblies positioned in the rearward bays.

Turning to FIG. 10, rack 100 is illustrated with a two-column, four-row array of forward pallet bays, each of which is shown occupied by palletized product assemblies 52. A corresponding array of rearward pallet bays is shown occupied by air handler assemblies 102, as also shown in FIG. 11. In this regard, rack 100 can be considered a "2-deep" rack structure because it is amendable to receiving two pallets, one behind the other, along a loading/unloading or "X" direction as shown. As described in detail below, rack 100 may be a commercially available rack configuration combined with air handler assemblies 102 to modularly and selectively induce airflow through one or more palletized product assemblies 52 for any individual pallet bay or combination of pallet bays.

In an exemplary embodiment, rack 100 may be used in warehouse 2, shown in FIG. 2, in place of the single deep rack 14 shown in, e.g., FIGS. 3 and 4. For example, two sets of racking 100 may be placed "back to back," with or without air chamber 6 formed therebetween (FIG. 4). An aisle 10 (FIG. 3) accesses the forward bays on both sides of the back-to-back racking structure, such that forklift 18 can access the pallet bays of each rack 100 from respective aisles 10. The back-to-back arrangement, and the use of air chamber 6, is not required for rack 100 when used in conjunction with air handler assemblies 102, because air handler assemblies 102 can induce the required airflow through each individual pallet bay without the use of the sealed plenum and centralized exhaust fans 12 shown in FIG. 4. Thus, in some applications, rack 100 may be used in a free standing configuration within warehouse 2.

Moreover, air handler assemblies 102 may be used with respective palletized product assemblies 52 independent of rack 100. For example, air handler assembly 102 may placed free-standing within a warehouse or other conditioned environment, and palletized product assembly may then be engaged with first airflow aperture 136 and swing seal 40 as described herein. Fan or air handler 126 may then be activated (e.g., by controller 130 as described below) to induce an air flow through and around palletized product assembly 52, thereby inducing heat transfer between the goods contained within cases 22 and the ambient air. Additional air handler assemblies 102 may be placed throughout the conditioned environment and used to effect heat transfer for additional palletized product assemblies 52 in a similar fashion, scaled according to the needs of the application.

For purposes of the present discussion, rack 100, air handler assemblies 102, and other associated structures will be discussed in the context of a Cartesian coordinate system shown in each of FIGS. 10 through 14. In use, rack 100 is typically placed on a level surface within warehouse 2 such that palletized product assemblies 52 and air handler assemblies 102 sit generally upright and level within respective pallet bays of rack 100. In this context, an "upright" orientation refers to a generally vertical orientation along the Z axis shown FIGS. 10 through 14. A "horizontal" or "level" orientation refers to an orientation along the X and/or Y directions. As illustrated, e.g., in FIG. 10, the Y direction will be considered as a lateral or "left-right" direction from the perspective of an operator facing the array of pallet bays of rack 100, e.g., from aisle 10 (FIGS. 2 and 3). The X direction is a depth or "front-to-back" direction, with the "front" or forward portion of rack 100 being the portion closest to the operator, while the "back" or rearward portion is the portion furthest from the operator.

Notwithstanding the foregoing, spatial terms such as "forward," "rearward," "upright," "vertical," "horizontal" and "level" are used for convenience and to establish relative positions, locations, and configurations with respect to other structures and a typical system user. Such terms are to be understood in this relative context and are not to be taken as absolute. For example, a structure which is "upright" in typical use is considered to be generally perpendicular to a "horizontal" structure, but such as "upright" structure need not necessarily be vertical with respect to gravity at all times. Stated another way, an "upright" structure can still be referred to as "upright" within the context of the present disclosure even if the structure is laid on its side. Similarly, a "forward" structure may still be referred to as such even if the perspective shifts (e.g., if an operator faces the structure from the opposite side).

In the illustrative embodiment of FIG. 10, each pallet bay is shown to define a width, height, and depth sized to receive a standard pallet 4 with cases 22 stacked thereupon to a standard height. For example, the pallet bays of rack 100 may be sized to accommodate a pallet 4 that is rectangular in shape and measures about 40 inches by about 48 inches, as noted above, with a plurality of cases 22 stacked thereupon up to a height of about 96 inches. In order to use standard, commercially available 2-deep racking 100, air handler assembly 102 may occupy a footprint similar to a standard-size pallet 4, i.e., 40 inches by 48 inches, and may have a height not exceeding a standard height for palletized product assembly 52, i.e., 96 inches. Thus, the depth along the X direction of rack 100 is sufficient to accommodate a combination of air handler assembly 102 in the rearward bay and palletized product assembly 52 in the forward bay, or may accommodate two palletized product assemblies 52. Similarly, a combination of two air handler assemblies 102 in the forward and rearward bays is possible, such as for storage.

Figure 12:
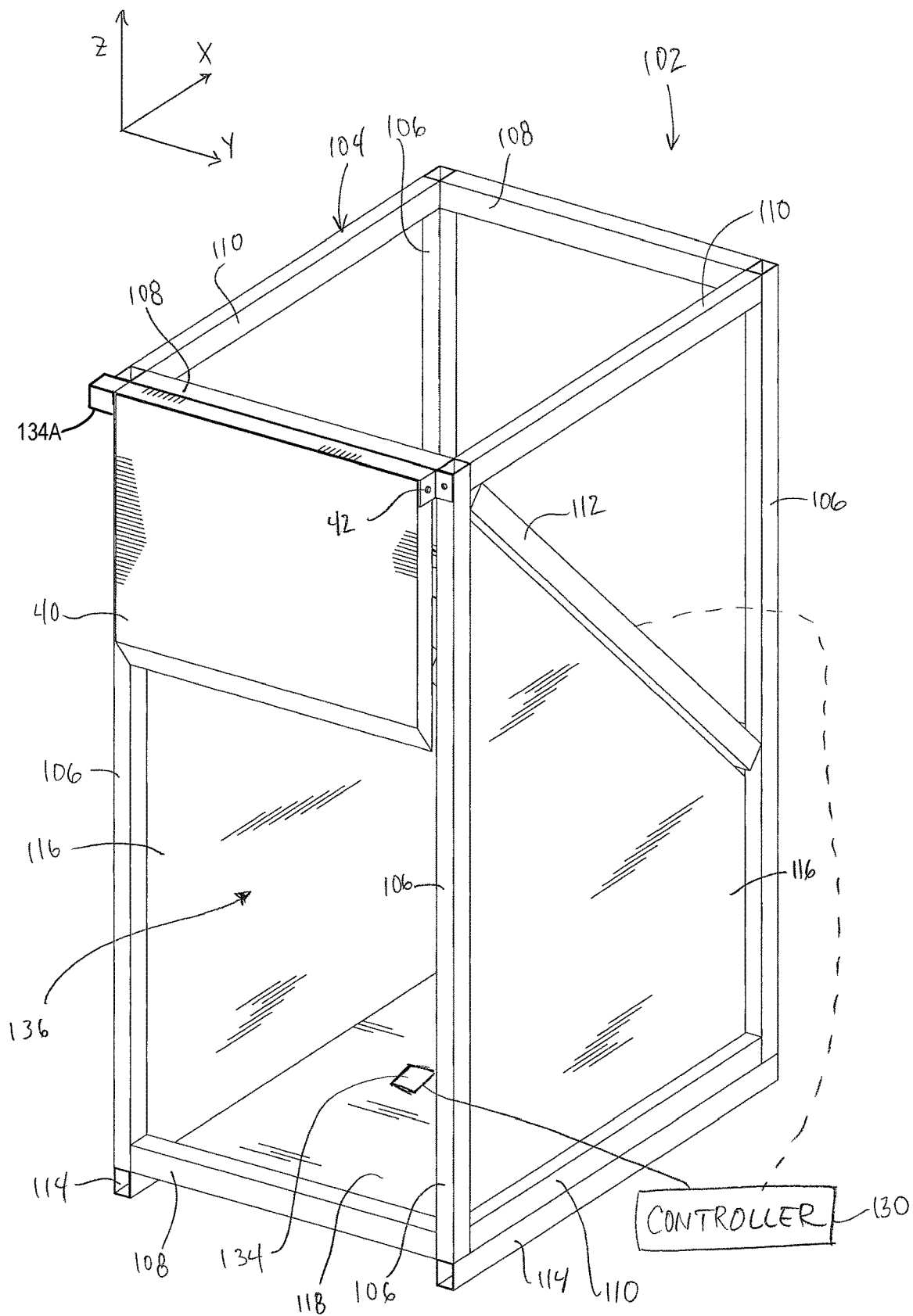
FIG. 12 is a perspective view of an air handler assembly made in accordance with the present disclosure.
Figure 13:
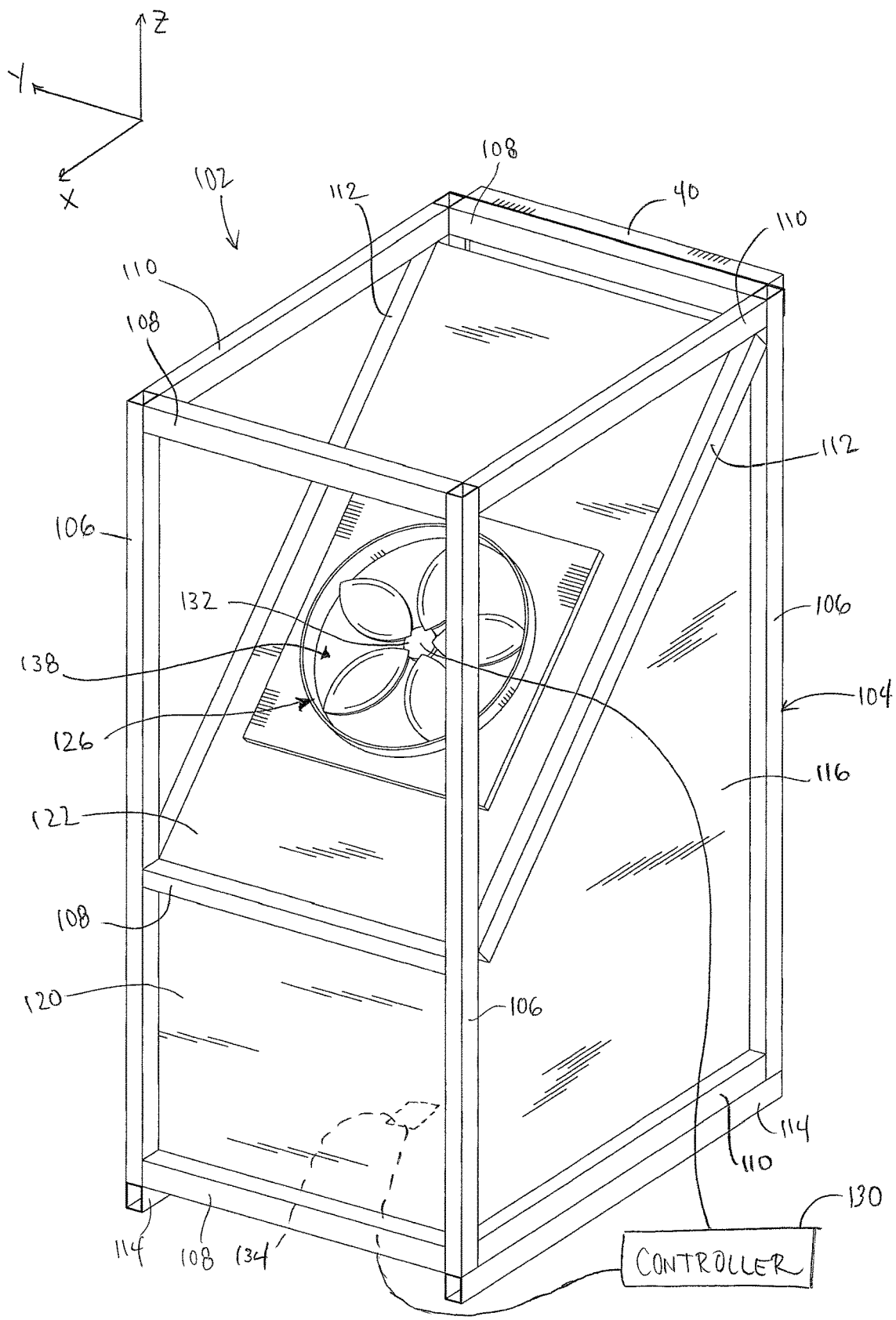
FIG. 13 is another perspective view of the air handler assembly shown in FIG. 12.
Figure 14:
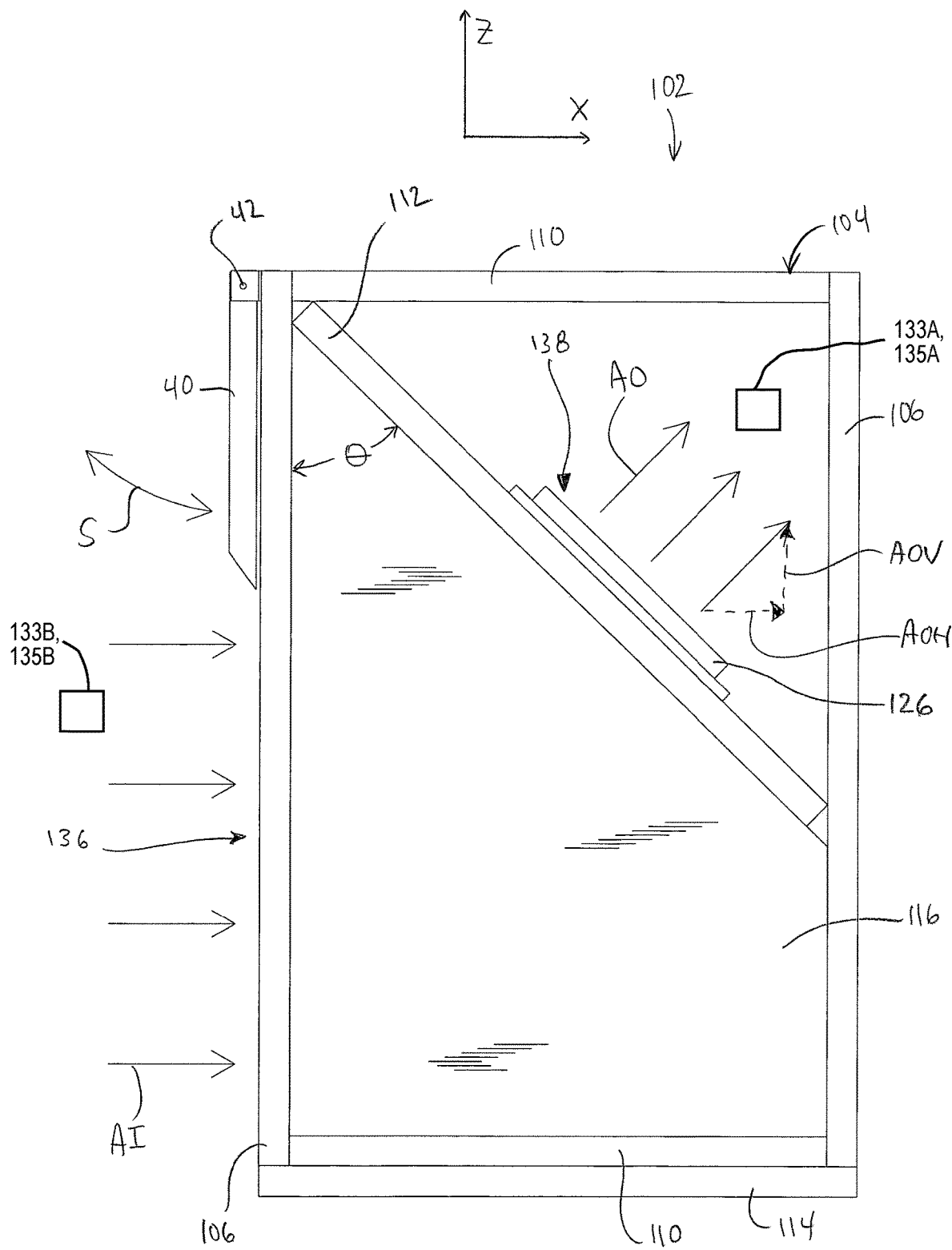
FIG. 14 is a side elevation view of the air handler assembly shown in FIG. 12, illustrating an exemplary airflow pattern therethrough.

Turning now to FIGS. 12 and 13, air handler assembly 102 is illustrated in detail from forward and rearward perspectives, respectively. Assembly 102 includes frame 104 with a plurality of enclosure panels 116, 118, 120, 122 which, taken together, create an enclosure having an airflow pathway extending between first airflow aperture 136 (illustratively, a front, intake opening as shown in FIGS. 12 and 14) and second airflow aperture 138 (illustratively, a discharge opening including fan 126, as shown in FIGS. 13 and 14). In an exemplary embodiment, the enclosure formed by enclosure panels 116, 118, 120, 122 is substantially sealed except for airflow apertures 136 and 138. As further described below, the airflow pathway through the enclosure facilitates a forced airflow through palletized product assembly 52 by operation of air handler 126 (FIG. 13).

Air handler assembly 102 includes frame 104, which includes upright frame members 106, laterally extending frame members 108 and front-to-back frame members 110. These frame members 106, 108 and 110 are joined together (e.g., by welding or mechanical fastening) to form a rectangular cuboid shape as best seen in FIGS. 12 and 13. This cuboid configuration allows multiple air handler assemblies 102 to be efficiently stacked upon and next to one another in, e.g., a storage space or transport truck. In an exemplary embodiment, base support members 114 are provided along a front-to-back direction at the left and right sides of frame 104, and are sized to allow the forks of forklift 18 underneath frame members 108 and base enclosure panel 118 (FIG. 12). This facilitates the retrieval, movement and placement of air handler assemblies 102 via forklift 18.

Frame 104 further includes angled frame members 112 which extend downwardly and rearwardly from the topmost and forward frame member 108, as best shown in FIG. 13. Frame members 112 provide support surfaces for the fixation of angled rear enclosure panel 122 to frame 104. Similarly, side enclosure panels 116 are supported by and fixed to respective front-to-back frame members 110, upright frame members 106, and angled frame members 112. A generally upright rear enclosure panel 120, disposed beneath the angled rear panel 122, is fixed to and supported by a pair of laterally extending frame members 108 and a pair of upright frame members 106, as shown if FIG. 13. Finally, a generally horizontal base enclosure panel 118 is fixed to and supported by two lower laterally extending frame members 108 and the left and right front-to-back frame members 110 as best shown in FIG. 12. In an exemplary embodiment, the components of frame 104, the enclosure panels 116, 120, 122, and the other components of air handler assembly 102 may be made of galvanized steel, stainless steel, powder coated steel or similar materials suitable for use in the food or human-consumable industries. Fan 126 and other components may be rated for washdown duty, as required or desired for a particular application.

Together, side enclosure panels 116, base enclosure panel 118 and angled rear enclosure panel 122 cooperate to bound first airflow aperture 136 in conjunction with the adjacent frame members. As illustrated in FIGS. 12 and 14, first airflow aperture 136 has a generally vertical and upright orientation which can sealingly engage a correspondingly vertical and upright surface of palletized product assembly 52. In particular, palletized product assembly 52 is sized to substantially or completely block airflow aperture 136 when positioned adjacent to or abutting air handler assembly 102, as is the case when palletized product assembly 52 occupies a forward bay of rack 100 and air handler assembly 102 occupies the adjacent rearward bay (FIGS. 10 and 11).

Second airflow aperture 138 is formed on the angled surface of the enclosure defined by angled rear enclosure panel 122, as illustrated in FIGS. 13 and 14. In particular, this surface has an angled orientation relative to the horizontal and upright directions, illustratively defining angle θ (FIG. 14) with respect to the vertical (i.e., "Z") direction. In an exemplary embodiment, angle θ is between 20 and 60 degrees, such as about 40 degrees.

In the illustrated embodiment, fan 126 is disposed within second airflow aperture 138 and creates an angled flow of outlet air AO (FIG. 14) which is substantially perpendicular to the angled planar surface of rear enclosure panel 122. This angled air flow directs outlet air upwardly and rearwardly from within the enclosure of air handler assembly 102, and into vacant space within frame 104 but outside the enclosure. This angled airflow profile allows outlet air to be directed rearwardly away from any structures stacked top of frame 104, such as another upper air handler assembly 102 as shown in FIG. 11. The flow is also directed upwardly away from any obstruction which may be behind frame 104. For example, in some arrangements two racks 100 may be positioned in a back-to-back arrangement with fans 126 of respective air handler assemblies 102 facing one another. By angling the flow upwardly, these two fans avoid detrimental competition with one another.

The angled airflow of outlet air AO provided by fan 126 has two vector components, namely, horizontal vector component AOH and vertical vector component AOV. The relative proportion of these vector components is controlled by angle θ, such that a reduction in angle θ increases the horizontal component AOH and decreases the vertical component AOV, and vice versa. Angle θ may be varied in order to vary the vector components AOH and AOV according to the needs of a particular application, such as the location of any structures which may impede airflow in the vicinity of air handler assembly 102, and other considerations as required or desired for a particular application.

In the illustrative embodiment of FIGS. 12 and 14, swing seal 40 is provided in an upper portion of first airflow aperture 136. Swing seal 40 is pivotally joined at pivot points 42 to an upper and forward end of frame 104, with a sealing surface that sits proud (i.e., forwardly) of aperture 136 as best seen in FIG. 14. Swing seal 40 is pivotable along a swing arc S (FIG. 14), and may be rearwardly pivoted into the enclosure of air handler assembly 102 when contacted by a pallet assembly 52 (see, e.g., FIG. 10). Swing seal 40 ensures that a low leakage top seal is made with pallet assembly 52 regardless of variability in pallet assembly height, thereby ensuring the substantial or complete blockage of aperture 136 by palletized product assembly 52. In particular, swing seal 40 pivots about a horizontal axis and substantially spans the space between adjacent upright frame members 106. Swing seal 40 is also spaced above base enclosure panel 118 leaving the remainder of aperture 136 exposed, while substantially blocking the remaining upper portion of aperture 136 as illustrated in FIG. 12. Further details of the construction, use and function of swing seal 40 may be found in U.S. Pat. No. 8,919,142, entitled "SWING SEAL FOR A RACK AISLE FREEZING AND CHILLING SYSTEM" and filed on Mar. 29, 2011, the entire disclosure of which is hereby explicitly incorporated by reference herein.

Additional sealing technologies may be employed in conjunction with air handler assembly 102 in order to minimize or eliminate air leakage around pallet assemblies 52, and instead drive maximum airflow through assemblies 52 via airflow pathways (e.g., through the airflow channels 38 of spacers 30 shown in FIG. 9). Examples of such sealing technologies, including brush seals which may be used along the left and right upright frame members 106 bounding first airflow aperture 136, are described in U.S. Patent Application Publication No. 2017/0086485, entitled "HEAT TRANSFER SYSTEM FOR WAREHOUSED GOODS" and filed Sep. 30, 2016, the entire disclosure of which hereby explicitly incorporated by reference herein.

As noted above, fan 126 serves as an air handler operable to drive air through palletized product assembly 52 via first airflow aperture 136 when the air handler is activated, such as by applying power to a fan motor 132 (FIG. 13). In the illustrative embodiment of FIG. 14, fan 126 is used to drive outlet air AO through second airflow aperture 138, while a corresponding flow of inlet air AI is drawn through first airflow aperture 136 (e.g., after passing through palletized product assembly 52). This configuration creates a vacuum or negative pressure within the enclosure formed by enclosure panels 116, 118, 120 and 122. Alternatively, fan 126 may be reversed to create a positive pressure within the enclosure, which would reverse the airflow and "push" air through palletized product assembly 52 rather than "pulling" air therethrough. Moreover, while fan 126 is one exemplary air handler compatible with air handler assembly 102, it is contemplated that other air handling technologies may be employed as required or desired for a particular application, such as blowers, ducted systems, and the like.

3. Use of Individualized Air Handlers for Modular Operation

As noted above, air handler assemblies 102 may be used in conjunction with 2-deep rack 100 to create a modular system of forced air transfer through palletized product assemblies 52, in which each air handler assembly 102 provides a dedicated air transfer mechanism for a given pallet bay. With rack 100 installed in a desired location, such as a cooling or thawing warehouse 2 (FIG. 1), air handler assemblies 102 may be installed into one or more rearward pallet bays as shown in FIGS. 10 and 11 and described above. In an exemplary installation, forklift 18 (FIG. 3) is equipped with a pantograph in order to allow for a "reach" by the forks into the rearward bay position, as is commonly performed with palletized product in 2-deep storage configurations. This long-reach forklift 18 places air handler assembly 102 in the rearward position of a desired pallet bay with first airflow aperture 136 facing forward into the adjacent forward bay, and the second airflow aperture 138 facing rearwardly away from the forward bay.

In some applications, air handler assembly 102 may be used as a stand-alone unit independent of any racking. For example, air handler assembly 102 may be placed on a floor adjacent to a palletized product assembly 52, and activated in order to induce a forced airflow through assembly 52 as described herein.

With air handler assembly 102 placed in the desired location, frame 104 may be secured to the adjacent support surface of rack 100 (e.g., horizontal racking beams) in order to prevent air handler assembly 102 from being pushed rearwardly or otherwise jostled out of place when palletized product assembly 52 is loaded into the forward bay. Such securement may be accomplished by angle brackets connected to base support members 114 of frame 104 and bolted to the adjacent support members of rack 100, for example. In an exemplary embodiment, such brackets may be positioned to take advantage of existing pallet support holes typically found in commercially available 2-deep racking 100. Alternatively, securement of air handler assembly 102 to rack 100 may be accomplished by any other suitable method, such as via bolts, pins, clamps, and the like.

Palletized product assembly 52 may then be loaded into the adjacent forward bay or rack 100 in front of air handler assembly 102, such as by operation of forklift 18. The rearward surface of palletized product assembly 52 is abutted against airflow aperture 136, and may pivot swing seal 40 along pivot direction S (FIG. 14) in order to form a top seal. When fully installed, palletized product assembly 52 substantially or completely blocks aperture 136 and forms a substantially air tight seal therewith. In one embodiment, airflow aperture 136 has a width of about 30 inches, such that a standard-width palletized product assembly (i.e., 40 inches or 48 inches depending on orientation) can be expected to fully block aperture 136 even without perfect side-to-side alignment of palletized assembly 52.

With the air handler assembly 102 and palletized product assembly 52 placed within rack 100 and sealingly engaged with one another, air handler 126 may be activated to drive an airflow through the palletized product assembly 52 and along the airflow pathway formed between airflow apertures 136 and 138 of air handler assembly 102. Where the ambient air around rack 100 is maintained at a temperature differential compared to palletized product assembly 52, such as with freezing air and above-freezing product contained within cases 22, the air flow induced by air handler 126 can effect heat transfer between the ambient air and palletized product within cases 22, there by promoting a thorough, evenly distributed, and rapid heat transfer throughout the product contained within palletized product assembly 52.

Additional air handler assemblies 102 may be installed within additional pallet bays of rack 100 as required for a particular application. Advantageously, any number of air handler assemblies 102 may be installed depending on how many individual palletized product assemblies 52 are desired for use with rack 100. Moreover, as palletized product assemblies 52 are removed from various pallet bays, the adjacent air handler assemblies 102 may be deactivated and/or removed in order to avoid unnecessary energy expenditure and/or space utilization. In some applications, the row of floor-position bays in rack 100 may be left vacant to allow for driveways for forklifts 18 (FIG. 3) or other warehouse equipment, or to provide staging areas for palletized product 52 as they await final positioning with rack 100 or withdrawal from warehouse 2. Advantageously, the use of air handler assemblies 102 allows for the lower row to be vacated without substantial reconfiguration of rack 100, while still allowing the upper bays to remain functional.

As noted above, the rectangular cuboid shape of air handler assemblies 102 facilitates storage, transport, and selective deployment of any number of air handler assemblies 102 to a warehouse or other facility. Frame 104 of air handler assembly 102 facilitates stacked storage of multiple air handler assemblies 102 in a relatively small space, such as a room or corner of a warehouse such as warehouse 2. When needed, a desired number of air handler assemblies 102 may be retrieved from the storage area and loaded into rearward pallet bays as needed. When the forced air operation on palletized product assemblies 52 is complete, air handler assemblies 102 may be withdrawn from rack 100 and placed back into storage.

In one embodiment, the storage area may be remote from the palletized product warehouse, and air handler assemblies 102 may be delivered as needed by transport truck or the like. For operators with seasonal businesses, such as fruit producers in Michigan or California for example, a set of air handler assemblies 102 may be delivered by transport truck at the time they are needed to condition and ship freshly picked fruit. When the harvest is complete, air handler assemblies 102 may be returned to a centralized location such as a manufacturer or distributor.

4. Electrical Control and Automatic Operation

In one exemplary embodiment, air handler assemblies 102 may be automatically activated and deactivated by controller 130, shown in FIGS. 12 and 13. Controller 130 is operably connected to occupancy sensor 134, which is configured and positioned to sense the presence or absence of palletized product assembly 52 in a forward pallet bay adjacent a given air handler assembly 102. For example, sensor 134 may be a pressure sensor located in the forward pallet bay, a light sensor located within the enclosure of air handler assembly 102 (as illustrated), a reed switch or other proximity sensor operably connected to swing seal 40, or any other suitable sensor. When senor 134 senses the presence of palletized product assembly 52 adjacent the air handler assembly served by sensor 134, an "occupied" signal is generated by sensor 134 and transmitted to controller 130. Controller 130 is programed to activate the air handler 126, such as by powering motor 132 of fan 126 (FIG. 13), in response to the occupied signal from sensor 134. In an exemplary embodiment, controller 130 may be operably connected to a plurality of sensors 134 positioned throughout the array of pallet bays within rack 100, and may individually and selectively activate or deactivate the air handler 126 for each individual bay based on the presence or absence of palletized product assembly 52 within that bay.

Controller 130 may automatically initiate a forced air flow through palletized product assembly 52 upon loading such assembly into a forward pallet bay, thereby ensuring that heat transfer or other airflow functions are automatically performed by virtue of the palletized product assembly 52 being positioned in the pallet bay. Similarly, controller 130 may be programed to cease the force air flow through pallet assembly 52 by deactivating air handler 126 when palletized product assembly 52 is absent from the adjacent bay. This "automatic" deactivation saves energy and reduces operational costs.

Turning to FIG. 12 another sensor 134A may be provided in connection with swing seal 40 for sensing the presence or absence of palletized product assembly 52 in a forward pallet bay adjacent a given air handler assembly 102. In particular, sensor 134A may be a rotation sensor which is activated as swing seal 40 is pivoted from a vertical position (as shown in FIG. 12) to an angled position along pivot direction S (FIG. 14) by interaction with an abutting palletized product assembly 52. Alternatively, sensor 134A may be a positional sensing switch activated by a surface of swing seal 40, or a hall-effect sensor activated by the nearby presence of the steel material of swing seal 40, for example.

Another sensor which may be employed to sense the presence or absence of palletized product assembly 52 in a forward pallet bay adjacent a given air handler assembly 102 may be provided in the form of a pair of pressure sensors 133A, 133B shown in FIG. 14. As illustrated, an outlet pressure sensor 133A may be provided in the flow path of outlet air AO, or more generally within a sealed plenum receiving outlet air AO and adjacent a particular pallet bay to be monitored. An inlet pressure sensor 133B may similarly be provided in the flow path of inlet air AI, or more generally in the ambient air from which the inlet airflow AI is drawn. Sensors 133A, 133B provide output signals to controller 130 respectively indicative of the pressure of outlet air AO (or the ambient pressure within the sealed plenum and adjacent the pallet bay being monitored) and inlet air AI (or the ambient air near rack 100 from which inlet air AI is drawn).

When palletized product assembly 52 is present in a given bay, a differential between the outlet and inlet pressures registered by sensors 133A and 133B will be detected as a result of the pressure drop resulting from air impedance presented by palletized product assembly 52. Based on empirical data for a given application, a range of pressure drops associated with the presence of palletized product assembly 52 may be programmed in controller 130, and controller 130 may then compare the measured pressure drop against the programmed range. When the measured pressure drop is within the range (or, in some cases, remains within the range for a predetermined amount of time), controller 130 determines that palletized product assembly 52 is present in the adjacent bay and issues a signal to continue activation of fan 126. When the measured pressure drop falls below the range (or remains below the range for a predetermined period of time), controller 130 determines that palletized product assembly 52 is not sealingly engaged with opening 136 or is otherwise not properly seated within the adjacent bay. Controller 130 then issues a signal or notification, such as a "red light" notification as detailed below, so that the system operator may adjust the seating of palletized product assembly 52 or otherwise troubleshoot the installation.

Yet another sensor may be provided in the form of temperature sensors 135A and 135B, shown in FIG. 14. A first temperature sensor 135A may be placed in the flow of outlet air AO or in the general vicinity of the air discharged from fan 126 (e.g., within a sealed plenum adjacent rack 100, if provided). A second temperature sensor 135B is placed in the flow of inlet air AI, or in the general ambient conditioned air within warehouse 2 containing rack 100. Sensors 135A, 135B provide output signals to controller 130 indicative of the temperature of outlet air AO and inlet air AI, respectively.

As the temperature of the product contained in palletized product assemblies 52 is undergoing adjustment (e.g., cooling from a warm state, freezing from a non-frozen state, thawing from a frozen state or heating from a cooled state), a temperature differential will be registered by controller 130 because the temperature of the ambient air which provides the inlet flow AI will be different from the temperature of the product, which in turn raises or reduces the temperature of the outlet flow AO. As the temperature of the product contained in palletized product approaches the temperature of the ambient air, however, this temperature differential will gradually reduce and eventually be eliminated. Controller 130 may monitor this temperature differential and compare such differential to a threshold, which may be a small nominal difference such as between 0.1-6.0 degrees Fahrenheit, for example. When the differential reaches the threshold (or, in some cases, remains below the threshold for a predetermined amount of time, such as several minutes), controller 130 may determine that the palletized product assembly 52 (or multiple assemblies 52) near one sensors 135A has reached its target temperature, and may therefore deactivate fan 126 in order to reduce ongoing energy usage.

Moreover, any combination of the sensors described herein may be provided in conjunction with controller 130, as required or desired for a particular application. For example, temperature sensors may be combined with presence/absence sensors so that the presence or absence of palletized product assembly 52 within a particular bay of rack 100 is known, and the relative state of heat transfer to the product within the cases 22 contained therein is simultaneously known. In addition to the sensor or suite of sensors providing signals to controller 130 for control over fan 126 and/or air handler(s) 8, controller may be programmed to periodically review the signal(s) received and reassess whether any action is needed on the basis of such signal(s). For example, controller 130 may have a "check interval" timer which, upon completion of a countdown, checks for the designated temperature differential, pressure differential, and/or activation of presence/absence sensor(s). Adjustments to operating parameters, such as activation or deactivation of fan 126 and/or air handler 8, may be performed per the programming of controller 130 (as described above). After such adjustments, the check interval timer may initiate a new countdown to the next check of sensor signals. While the time is counting down, controller 130 may ignore any changes of sensor signals. This operating modality, and the nominal time value for the check sensor timer, may be used to avoid "hunting" or unsteady behavior in the outputs of controller 130. In one embodiment, the check sensor timer is set at an interval between 1 and 3 minutes, such as about 2 minutes.

In addition to control over fan 126, air handler 8 and other systems associated with racking 100, controller 130 may also be provided to output notifications based on the status of the sensor or suite of sensors being monitored. For example, when a temperature differential derived from temperature sensors 135A, 135B (FIG. 14), reaches a threshold which indicates that the heat transfer operation (e.g., freezing, thawing, chilling or heating) is complete, controller 130 may output an "operation done" notification to the system operator. Similarly, controller 130 may output an "occupied" or "non-occupied" signal to indicate whether palletized product assembly 52 within a particular bay of rack 100 is present in any or all of the bays of rack 100.

In one exemplary embodiment, a set of changeable signals, such as multicolored lights, may be provided to output a succinct notification from controller 130 as to the state of the adjacent bay of racking 100 and its contents. For example, a green light on a given bay of rack 100 may be used to indicate that palletized product assembly 52 is present, and that the heat transfer operation is complete. A yellow light may indicate that palletized product assembly 52 is present, but the heat transfer operation is underway and not yet complete. A yellow light may indicate that palletized product assembly 52 is not present, and/or a fault condition has been detected (e.g., fan 126 is not functional, one or more sensors is not functional, etc.).

As noted above, a set of air handler assemblies 102 may be delivered to a site for activation at a time of need, and later removed from the site when the need has passed. To facilitate rapid set up and takedown of such a modular collection of air handler assemblies, each assembly 102 may be electrically connectable to a neighboring assembly 102 in a "daisy chain" style. For example, each assembly 102 may include a junction box or similar electrical inlet at one side of frame 104 (e.g., one of the left or right side when facing airflow aperture 136) and a corresponding outlet on the other side (e.g., the other of the left or right side when facing airflow aperture 136). Cords may be provided to connect the electrical inlet of one assembly 102 to the electrical outlet of a neighboring assembly 102. This creates an electrical connection between the two neighboring assemblies 102 which enables power-up or power-down of both assemblies 102 based on a common command from controller 130, which may plug into the inlet at the end unit of the collection of assemblies 102. In this way, a series of interconnected air handler assemblies 102 may be provided with a common controller 130, and any number of assemblies 102 may be provided according to the requirements of the application at hand.

Further, such as series of air handler assemblies 102 may be provided at various locations, such as a series for each of multiple vertical levels along rack 100 (FIG. 10), or a series for each of a collection of racks 100 (FIG. 10). At the end of each series of interconnected air handler assemblies 102, a connection may be made from controller 130 for individual control over each series, or a common electrical connection may be made for one or more series (e.g., via a busbar) for common control over multiple series.

While this disclosure has been described as having exemplary designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A pallet rack assembly comprising:
    a pallet rack having a plurality of bays, each bay having:
        a bay width sized to receive a palletized product assembly including a standard-sized pallet with a plurality of stacked cases received thereon;
        a bay height sized to receive the palletized product assembly; and
        a bay depth sized to receive at least two of the palletized product assembly, such that each bay defines a rearward bay and a forward bay sized to receive the palletized product assembly; and
    a modular air handler assembly received in at least one of the plurality of bays and occupying a footprint of the standard-sized pallet, the air handler assembly comprising:
        an enclosure having a first airflow aperture facing toward the forward bay and a second airflow aperture facing away from the forward bay, the first airflow aperture of the enclosure sized to be substantially or completely blocked by the palletized product assembly when the palletized product assembly is positioned in the forward bay; and
        an air handler in fluid communication with the second airflow aperture of the enclosure, such that the air handler is operable to drive air through the palletized product assembly via the first airflow aperture when the air handler is activated.

2. The pallet rack assembly of claim 1, further comprising an air chamber disposed rearwardly of the rearward bay, the air handler oriented and configured to drive the air between the air chamber and the enclosure.

3. The pallet rack assembly of claim 2, wherein the pallet rack comprises a first pallet rack, the assembly further comprising a second pallet rack disposed on an opposite side of the air chamber as compared to the first pallet rack, whereby a plurality of the modular air handler assemblies may drive the air between the first and second pallet racks and the air chamber.

4. The pallet rack assembly of claim 1, wherein:
    the first airflow aperture of the enclosure has an upright orientation;
    the second airflow aperture of the enclosure has an angled orientation relative to horizontal and upright directions; and
    the air handler comprises a fan disposed in the second airflow aperture, such that that the fan is positioned to drive the air into or out of the enclosure along an angled airflow direction having both horizontal and vertical vector components.

5. The pallet rack assembly of claim 4, wherein the enclosure comprises:
    a base enclosure panel having a substantially horizontal orientation;
    a pair of side enclosure panels having a substantially upright orientation, the pair of side enclosure panels respectively joined to the base enclosure panel; and
    at least one rear enclosure panel joined to the base enclosure panel and the pair of side enclosure panels, the rear enclosure panel having the angled orientation of the second airflow aperture,
    the first airflow aperture formed between the base enclosure panel and the pair of side enclosure panels, and
    the second airflow aperture formed in the rear enclosure panel.

6. The pallet rack assembly of claim 5, wherein the enclosure further comprises a swing seal pivotably joined to the enclosure about a substantially horizontal axis, the swing seal disposed in the first airflow aperture between the pair of side enclosure panels and spaced above the base enclosure panel such that the swing seal forms an adjustable upper boundary of the first airflow aperture.

7. The pallet rack assembly of claim 5, wherein the enclosure further comprises a frame having a plurality of frame members providing a plurality of mounting surfaces for the respective enclosure panels, the frame forming a rectangular cuboid shape whereby multiple modular air handler assemblies are stackable upon one another.

8. The pallet rack assembly of claim 7, wherein the frame further comprises a pair of base support members extending downwardly away from the base enclosure panel, the base support members sized and configured to allow forklift forks to pass between the base enclosure panel and a support surface.

9. The pallet rack assembly of claim 1, further comprising:
- a sensor positioned and configured to sense the presence of the palletized product assembly in the adjacent forward bay; and
- a controller operably connected to the sensor, the controller programmed to activate the air handler when the sensor indicates the presence of the palletized product assembly in the adjacent forward bay.

10. An air handler assembly, comprising:
an enclosure comprising a plurality of panels defining an airflow pathway between a first airflow aperture and a second airflow aperture,
- the plurality of panels configured to admit an airflow at one of the first and second airflow apertures and expel the airflow at the other of the first and second airflow apertures,
- one of the first and second airflow apertures formed on a substantially upright surface of the enclosure, and
- the other of the first and second airflow apertures formed on an angled surface of the enclosure, the angled surface having an angled orientation relative to horizontal and upright directions defining an angle therebetween of between 20 and 60 degrees; and
- an air handler in fluid communication with the angled airflow aperture and operable to drive the airflow along the airflow pathway when the air handler is activated.

11. The air handler assembly of claim 10, wherein the enclosure comprises:
- a base enclosure panel having a substantially horizontal orientation;
- a pair of side enclosure panels having a substantially upright orientation, the pair of side enclosure panels respectively joined to the base enclosure panel; and
- at least one rear enclosure panel joined to the base enclosure panel and the pair of side enclosure panels, the rear enclosure panel having the angled orientation of the second airflow aperture,
- the first airflow aperture formed between the base enclosure panel and the pair of side enclosure panels, and
- the second airflow aperture formed in the rear enclosure panel.

12. The air handler assembly of claim 11, wherein the at least one rear enclosure panel comprises:
- a rear enclosure panel having a substantially upright orientation, the rear enclosure panel joined to the base enclosure panel and the pair of side enclosure panels; and
- an angled rear enclosure panel having the angled orientation, the angled rear enclosure panel joined to the rear enclosure panel and the pair of side enclosure panels, the angled rear enclosure panel having the second airflow aperture formed therein.

13. The air handler assembly of claim 12, wherein the enclosure further comprises a swing seal pivotably joined to the enclosure about a substantially horizontal axis, the swing seal disposed in the first airflow aperture between the pair of side enclosure panels and spaced above the base enclosure panel such that the swing seal forms an adjustable upper boundary of the first airflow aperture.

14. The air handler assembly of claim 12, wherein the enclosure further comprises a frame having a plurality of frame members providing a plurality of mounting surfaces for the respective enclosure panels, the frame forming a rectangular cuboid shape whereby multiple modular air handler assemblies are stackable upon one another.

15. The air handler assembly of claim 14, wherein the frame further comprises a pair of base support members extending downwardly away from the base enclosure panel, the base support members sized and configured to allow forklift forks to pass between the base enclosure panel and a support surface.

16. The air handler assembly of claim 10, in combination with a palletized product assembly comprising a pallet and a plurality of cases supported by the pallet, the palletized product assembly engaged with the first airflow aperture.

17. A method of effecting forced-air transfer through palletized product, the method comprising:
- loading an air handler assembly into a rearward pallet bay of a rack assembly, such that a first airflow aperture of the air handler assembly faces a forward pallet bay and a second airflow aperture faces rearward of the rack assembly, with an airflow pathway formed between the first and second airflow apertures;
- loading a palletized product assembly into the forward pallet bay such that the first airflow aperture is substantially or completely blocked by the palletized product assembly, the palletized product assembly including a standard-sized pallet and a palletized product received on the standard-sized pallet, the forward pallet bay sized to receive the standard-sized pallet and palletized product; and
- activating an air handler of the air handler assembly, the air handler in fluid communication with the second airflow aperture such that the step of activating drives an airflow through the palletized product assembly and along the airflow pathway, the air handler assembly occupying a footprint of the standard-sized pallet, the rearward pallet bay having a size of the forward pallet bay and sized to receive the air handler assembly.

18. The method of claim 17, wherein the step of loading the palletized product assembly into the forward pallet bay comprises engaging the palletized product assembly with a pivotable swing seal disposed at an upper portion of the first airflow aperture.

19. The method of claim 17, further comprising retrieving the air handler assembly from a storage area having a plurality of stacked air handler assemblies, before the step of loading the air handler assembly into the rearward pallet bay.

20. The method of claim 17, wherein the step of loading the air handler assembly into the rearward pallet bay is accomplished with a forklift.

* * * * *